United States Patent
Viswanathan

(10) Patent No.: US 10,394,826 B1
(45) Date of Patent: Aug. 27, 2019

(54) SYSTEM AND METHODS FOR SEARCHING QUERY DATA

(71) Applicant: AMAZON TECHNOLOGIES, INC., Reno, NV (US)

(72) Inventor: Suresh Viswanathan, Sammamish, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 531 days.

(21) Appl. No.: 14/187,710

(22) Filed: Feb. 24, 2014

(51) Int. Cl.
*G06F 16/2457* (2019.01)

(52) U.S. Cl.
CPC .............................. *G06F 16/24578* (2019.01)

(58) Field of Classification Search
None
See application file for complete search history.

(56) References Cited

U.S. PATENT DOCUMENTS

| | | | |
|---|---|---|---|
| 8,082,235 B1* | 12/2011 | Dasilva | G06F 17/30817 707/691 |
| 8,868,590 B1* | 10/2014 | Donneau-Golencer | G06F 17/3053 707/733 |
| 2002/0049738 A1* | 4/2002 | Epstein | G06F 17/30864 |
| 2005/0289111 A1* | 12/2005 | Tribble | G06F 17/30979 |
| 2006/0248078 A1* | 11/2006 | Gross | G06F 17/3064 |
| 2008/0071771 A1* | 3/2008 | Venkataraman | G06F 17/30713 |
| 2010/0106729 A1* | 4/2010 | Pan | G06F 17/30864 707/747 |
| 2013/0166573 A1* | 6/2013 | Vaitheeswaran | G06F 17/30389 707/749 |
| 2014/0143223 A1* | 5/2014 | Shi | G06F 17/3064 707/706 |
| 2014/0201194 A1* | 7/2014 | Reddy | G06F 17/30554 707/722 |
| 2014/0222826 A1* | 8/2014 | DaCosta | G06F 17/30592 707/741 |
| 2014/0236994 A1* | 8/2014 | Aikawa | G06F 17/3053 707/772 |
| 2014/0280120 A1* | 9/2014 | Sharp | G06F 17/3053 707/732 |
| 2015/0074137 A1* | 3/2015 | Chang | G06F 17/30973 707/767 |
| 2015/0169582 A1* | 6/2015 | Jain | G06F 17/3053 707/748 |
| 2016/0171008 A1* | 6/2016 | Ciabrini | G06Q 10/02 707/609 |
| 2016/0274940 A1* | 9/2016 | Birdsall | G06F 17/30592 |

* cited by examiner

Primary Examiner — Christopher J Raab
(74) Attorney, Agent, or Firm — Lindauer Law, PLLC

(57) ABSTRACT

Computing systems may use queries to retrieve information from databases. Described herein are systems and methods for searching for one or more queries from a database storing a large amount of queries. In some implementations, the system enables a user to enter search terms, and the system retrieves one or more queries based on a comparison of the search terms and metadata associated with the queries. The system may rank the retrieved queries based on an analysis of ranking factors such as a number of times the query has been selected for processing by other users.

20 Claims, 8 Drawing Sheets

US 10,394,826 B1

SYSTEM AND METHODS FOR SEARCHING QUERY DATA

BACKGROUND

Data warehouses may store large amounts of various data. In a data warehousing environment, systems may use queries to retrieve portions of the stored data. Users may spend a significant amount of time creating the queries. These queries may be reused. As the number of created queries continues to grow, finding these queries becomes difficult.

Figure 1:
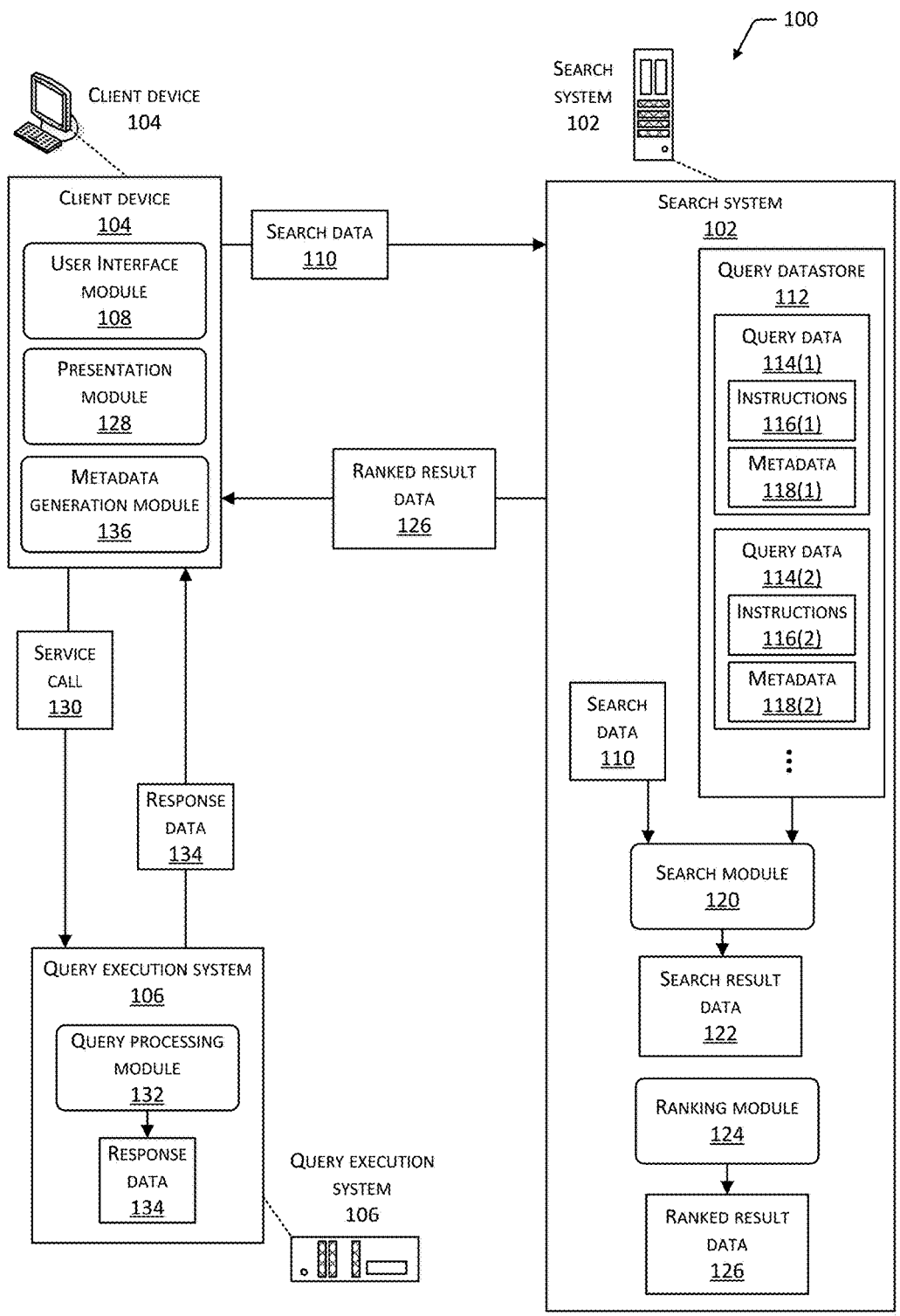
FIG. 1 is an illustrative system for searching queries based on search data and metadata.

Certain implementations and embodiments will now be described more fully below with reference to the accompanying figures, in which various aspects are shown. However, various aspects may be implemented in many different forms and should not be construed as limited to the implementations set forth herein. Like reference numbers in the figures refer to like elements throughout.

DETAILED DESCRIPTION

Databases may store large amounts of data. A query may comprise a set of instructions used to retrieve data from the databases. Users may spend a significant amount of time creating queries. Users may review existing queries to help create new queries. In some cases, the users may reuse an existing query. A query datastore may store a large number of queries (e.g., two million queries) created by many different users. As the number of created queries continues to grow, searching for a query from the large number of queries becomes difficult. This disclosure relates to systems and methods for searching for queries from a large collection of queries. By finding relevant queries, users may save time which may have been wasted creating new or redundant queries that have already been created by another user.

The system may comprise a search system that is in communication with one or more client devices. The search system may comprise one or more computing devices such as a server. The client device may comprise one or more computing devices such as a desktop computer. As discussed in more detail below, the client device may provide search terms to the search system, and the search system may provide search results to the client device based on the search terms.

Once the search system receives the search terms, the search system may access a query datastore that stores different query data. This query data may represent a large number of queries such as two million queries. The query data may include various information such as instruction data, metadata, and sample output data.

The instruction data may comprise data representative of a query. The query may comprise a set of instructions used to retrieve information from a database. Retrieving information from a database may include reading information from a table stored within the database. In some implementations, the set of instructions comprises instructions expressed using structured query language ("SQL"). SQL may be described as a programming language used to query, update, and manage relational databases.

The metadata may comprise information about the query. As discussed in more detail below, the search system may use the metadata to search the query datastore.

The metadata may include various data. The metadata may include reason data representative of an explanation for creating a given query. For example, an internal business user may have created a particular query because the internal business user was interested in determining which item(s) are generating a relatively high amount of revenue. In this example, the reason data may comprise information indicating that the query was created to determine which item(s) generate relatively high amounts of revenue.

The metadata may include table data comprising information about tables which are associated with the query. In one example, for a first query, the information may comprise an identification of a table which is accessed when the first query is executed.

The metadata may include field data that represents information about fields associated with the query. For example, when a first query is executed, one or more fields of a table may be accessed to retrieve requested information. Additional examples of the types of other data that may be included within the metadata are described in more detail below.

The query data may include sample output data representative of previously generated results that were generated in response to a particular query being previously executed. In one example, a first query is executed an hour ago, resulting in a report being generated that lists the revenue generated for items in descending order. This report may be stored as the sample output data associated with the first query. Thereafter, another user may operate with the search system and find the first query. Rather than causing the first query to be executed again, the user may be satisfied with the report from the sample output data because the report was generated only on hour ago. Accordingly, the search system may provide the report from the sample output data to the user.

The search system may generate search result data representing search results. The search results may include a set of different query data. The search system may generate the search result data in response to receiving search data. The client device may be configured to generate the search data. The search data may comprise information used by the search system to search for queries from the query datastore. The search data may include search terms which are analyzed by the search system to retrieve queries from the query datastore. The search terms may include, text data such as "top selling items" or "what is the order rate for item X".

In some implementations, the search system retrieves different query data based on search terms matching metadata of the different query data. For example, where the search terms are "top selling items", the search system may retrieve each query data that includes the text "top selling items" listed in the reasons for creating the query. In another example, the search system retrieves query data based on an analysis of data other than the search terms with the metadata. For example, the search system may select queries based on the identification of the user conducting the search for the queries. In another example, the search system may select queries based on the department or team of the user conducting the search for the queries.

In some implementations, the system includes a query execution system in communication with the client device. The query execution system may comprise one or more computing devices such as a server. The query execution system may generate response data comprising information requested by the client device. The query execution system may generate the response data in response to receiving service call data from the client device. The client device may generate the service call data. The service call data may comprise data representing a request for the query execution system to perform a service such as executing a particular query.

In some implementations, the search system ranks the search results. The search system may generate ranked result data representative of the ranked search results. In one example, the search system ranks the search results by determining a score for each query based on the number of search terms which match the metadata of the query. The search system may rank the queries in descending order. By ranking the results, a user may more quickly find the most relevant query. Different processes for ranking the queries are discussed in more detail below.

In some implementations, the client device generates the metadata. The client device may receive inputs from users which correspond to the metadata. For example, a user may type in that a particular query has been created because the user is interested in determining how many orders have been placed for a particular category of items. In some implementations, the client device automatically generates the metadata. For example, the client device may be configured to parse the text of the query to determine which tables will be accessed during execution of the query. In another example, the client device automatically generates metadata based on a user identification associated with the user that created the query.

The query datastore described herein may store millions of queries. The search system may enable users to search the query datastore, resulting in enabling users to view existing queries. By viewing existing queries, the user may save time which may be wasted creating new or redundant queries that have already been created by another user and stored within the query datastore.

Illustrative System

FIG. 1 is an illustrative system 100 for searching queries based on search data and metadata. The system 100 includes a search system 102 operatively connected to a client device 104 using a network (not shown), and a query execution system 106 operatively connected to the client device 104. As discussed in more detail below, the client device 104 requests for the search system 102 to provide certain queries based on search terms. A user operating the client device 104 may review the queries provided by the search system 102, and operate with the client device 104 to request for the query execution system 106 to execute one or more of the queries provided by the search system 102.

The network facilitating communication between the search system 102, the client device 104, and the query execution system 106 may include a variety of networks, such as a local network, a wide area network ("WAN"), broadcast network, a personal area network ("PAN"), a wired and wireless local area network ("LAN"), and so forth. In some implementations, the network includes at least one of Ethernet, Wi-Fi as promulgated by the Wi-Fi Alliance, 3G and 4G, Bluetooth as promulgated by the Bluetooth Special Interest Group, and so forth. In some implementations, the devices and systems described herein are configured to directly connect to each other. The system 100 may include additional servers which communicate with the search system 102, the client device 104, and the query execution system 106.

The client device 104 includes a user interface module 108 configured to provide a user interface to a user and to accept inputs received from the input/output ("I/O") devices (not shown). The user interface may include one or more visual, audible, or haptic elements. For example, the user interface may be configured to provide a graphic user interface, an audible user interface, and so forth.

The client device 104 may be configured to generate search data 110 that is used by the search system 102 to search for queries. The search data 110 may include various information. The search data 110 may include search terms entered by a user operating with the user interface. For example, the user may enter the following search terms: "items generating the most revenue." The search data 110 may comprise other information such as information about the user that enters in the search terms, information about the client device 104 being used to enter the search terms, and so forth. In FIG. 1, the client device 104 provides the search data 110 to the search system 102 using the network.

In FIG. 1, the search system 102 includes a query datastore 112. The query datastore 112 may comprise a data structure which is stored on one or more memory devices. The query datstore 112 may store a plurality of different query data 114. For example, in FIG. 1, the query datastore 112 includes at least query data 114(1) and 114(2). The query datastore 112 may store a large number of different query data 114 such as two million different query data 114. The query data 114 may be generated in response to users writing queries over a period of time. In some cases, a query may be reusable by the same user that wrote the query, or another user. Reusing a query may save time for a user that otherwise would have rewritten the query. Reusing a query may also cause less consumption of resources used to store new queries.

The query data 114 may comprise various information. For example, the query data 114 may include instructions 116, metadata 118, and so forth. The instructions 116 may comprise a set of instructions used to retrieve information from a database. In one example, the instructions 116 comprise a query written in SQL.

The metadata 118 may comprise various information about the instructions 116. For example, the metadata 118 may indicate how often a query has been used, which user wrote the query, when the query was created, and so forth. The metadata 118 is discussed in more detail below with regard to FIG. 2.

The search system 102 may include a search module 120 configured to generate search result data 122. The search result data 122 may comprise query data 114 selected based on the search data 110. In one example, the search module 120 compares the search terms from the search data 110 with terms included within the metadata 118. For a first query, the metadata 118 may include terms indicating the reason for the creation of the first query. In this example, the terms of the metadata 118 indicate the following reason: "determine which items generate the most revenue." In this example, at a client device 104, a user enters in the following search terms: "which items generate the most revenue?" The search module 120 compares the search terms (i.e., "which items generate the most revenue?") with the terms of the metadata 118 (i.e., "determine which items generate the most revenue"), and determines that a threshold number of the search terms match the terms of the metadata 118. Based on the determination that at least the threshold number of terms match, the search module 120 generates search result data 122 that includes the first query. Accordingly, the user that entered in the search terms may be interested in running the first query, because the results that would be generated by an execution of the first query may be what the user is interested in obtaining. The search system 102 may include a ranking module 124 configured to generate ranked result data 126. The ranked result data 126 may comprise selected query data 114 organized by relevance. For example, the ranking module 124 may list a set of different queries in descending order based on scores that are generated for each query. In one example, a first query may have a higher score than a second query because more search terms match terms of the metadata 118 for the first query when compared to the number of search terms that match the terms of the metadata 118 for the second query.

In FIG. 1, the search system 102 provides the ranked result data 126 to the client device 104. The client device 104 may include a presentation module 128 configured to present the ranked result data 126. Presenting the ranked result data 126 may include displaying a list of queries with a display device. The client device 104 may enable a user to select a query for further processing. In one example, the selection of the query may cause the client device 104 to generate a service call 130. The service call 130 may represent a request for the query execution system 106 to process the selected query.

Once the query execution system 106 receives the service call 130, a query processing module 132 may process the service call 130. The query processing module 132 may generate response data 134 comprising information retrieved in response to the execution of the selected query. In some implementations, the client device 104 enables the user of the client device 104 to select between different types of responses. For example, the response may comprise an email that includes the response data 134. In another example, the response data 134 may be stored within a database separate from the client device 104. The user may access the response data 134 at a later time using the network. In some implementations, the query execution system 106 determines how to provide the response data 134 based on a profile associated with the user of the client device 104. The system 100 may enable the user to configure their profile such that response data 134 is presented to the user based on the selections or inputs made by the user. For example, for a first type of report, the user may configure their profile to have the response data 134 emailed to the user, and for a second type of report, the user may configure their profile to have the response data 134 stored in a separate database.

Once the query execution system 106 generates the response data 134, the query execution system 106 may provide the response data 134 to the client device 104. The presentation module 128 may display the response data 134 to the user of the client device 104. The presentation module 128 may be configured to process the response data 134. In one implementation, the presentation module 128 integrates the response data 134 into a computer program. For example, the presentation module 128 may integrate the response data 134 into a spreadsheet. The spreadsheet may include various formulas that apply computations on the response data 134. The presentation module 128 may display the spreadsheet as a report including the values calculated by the formulas of the spreadsheet.

In some implementations, the client device 104 includes a metadata generation module 136. The metadata generation module 136 may be configured to generate metadata 118 for a query. In one example, a user writes a query using the client device 104. The metadata generation module 136 may enable the user to type in a reason that the user wrote the query. For example, one reason that user may have written the query was to determine which items are generating the lowest amount of revenue.

By enabling users to create metadata 118 for the queries, the search system 102 may search for the queries based on the metadata 118, and return the results of the search to a user searching for a query. Users may save time creating new queries by reusing previously created queries. Furthermore, by enabling users to search for queries, the search system 102 may help the searchers generate new ideas. For example, before running a search, a user may not have been aware of a particular useful existing query created some time ago.

While the system 100 depicted in FIG. 1 depicts the search system 102 separate from the query execution system 106, in other implementations, the functions attributed to the search system 102 and the query execution system 106 may be provided by a single server. In some implementations, a plurality of devices providing the functions may exist as a virtualized server executing across a plurality of physical servers.

In some implementations, the query execution system 106 provides the service call 130 to another computing device (not shown) for processing. In these implementations, the query execution system 106 may operate as a job scheduler that allocates jobs to cluster nodes in a data warehouse.

Figure 2:
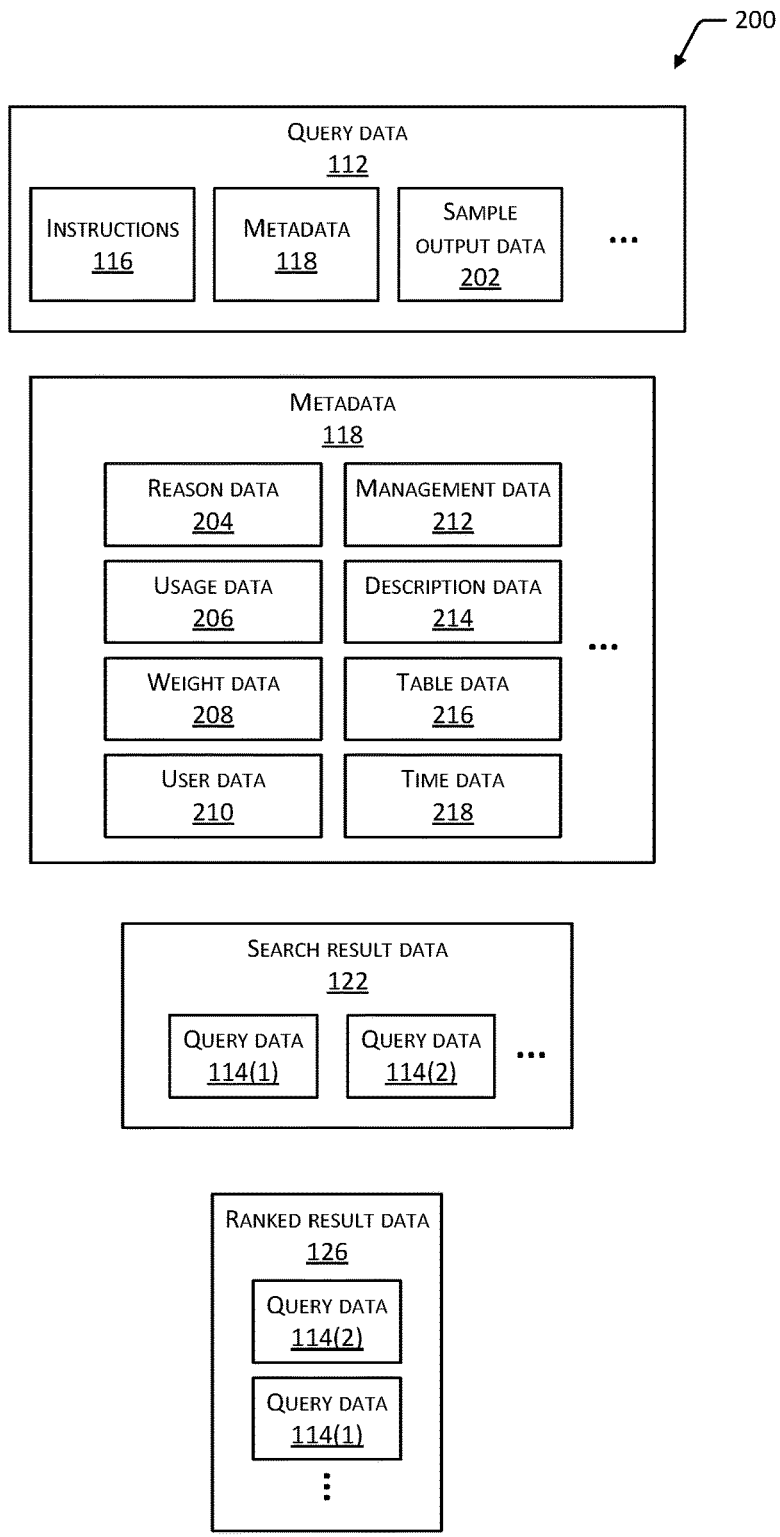
FIG. 2 illustrates examples of query data, metadata, search result data, and ranked result data.

FIG. 2 illustrates examples of the query data 114, the metadata 118, the search result data 122, and the ranked result data 126. As discussed above with regard to FIG. 1, the query data 114 may include the instructions 116 and the metadata 118. The query data 114 may include other data such as sample output data 202. The sample output data 202 may represent a sample of the type of information that is retrieved when the query is executed. In some implementations, the sample output data 202 comprises the response data 134 which was generated by the query execution system 106 for the last time the query was executed. The sample output data 202 may indicate at least one of a date or time in which the sample output data 202 was generated. Such information may be useful, because a user may decide that because a particular sample output data 202 may have been generated recently (e.g., within the last hour) and that the information that the user was interested in retrieving is included with the particular sample output data 202.

The search system 102 may enable users to search for queries by searching the metadata 118 associated with the queries. The metadata 118 may include various information such as reason data 204, usage data 206, weight data 208, user data 210, management data 212, description data 214, table data 216, time data 218, and so forth.

The reason data 204 may indicate a reason why the query was created. The reason data 204 may be entered by a user operating the client device 104 using an input device (e.g., a keyboard). The reason(s) a user creates a query may include various reasons. For example, a user may create a query because the user is interested in obtaining information about certain items being sold, information about people, and so forth.

The usage data 206 may represent a value indicative of the number of times a particular query is accessed or used. For a particular query, the search system 102 may update or generate the value of the usage data 206 in response to a user selecting the particular query. For example, in response to a request for a query search, the client device 104 may display a list of searched queries. Each time a particular displayed query is selected by the user, the search system 102 may increase the value of the usage data 206, reflecting that the particular query was selected. A query that is selected or used more than another query may be indicative that the query is a popular query or a well written query. In some implementations, the search system 102 ranks the search results based on the usage data 206.

The weight data 208 may represent a value indicative of an amount of resources consumed to process the query. The resources may include memory, processor time, input/output, and so forth. Users may be interested in queries which consume fewer resources when compared to other queries. The consumption of resources may cost money. In some implementations, the search system 102 ranks the search results based on the weight data 208.

The user data 210 may include various information. For example, the user data 210 may identify the user that created the query. Users may have reputations for writing queries. A user searching for a query may interested in queries created by a particular user because that particular user may have a reputation for creating well written queries.

The management data 212 may indicate a group, team, or department that manages a particular query. For example, a first department may be in charge for managing a first query. The first department may have a reputation for managing well written queries. Users may search for queries that are managed by the first department.

The description data 214 may comprise information that describes the query. The information may be described as a summary of the query. The search system 102 may determine whether a particular query should be retrieved by comparing the search data 110 with the description data 214.

The table data 216 may indicate information about tables which may be accessed when a particular query is executed. For example, when a particular query is executed or processed by the query execution system 106, the particular query may cause the query execution system 106 to retrieve information from a first table and a second table. Tables may include fields which may be described as rows or columns of a particular table. The table data 216 may identify at least one of the tables or the fields of the tables that are accessed when the data is retrieved. In some cases, a user may be interested in searching for queries which access certain tables or fields.

The time data 218 may indicate at least one of a date or time in which a particular query was created, last modified, last accessed, last used, and so forth. A user may be more interested in queries generated or used at certain times.

As discussed above with regard to FIG. 1, the search result data 122 may represent search results. In FIG. 2, the search result data 122 includes a plurality of query data 114 including query data 114(1), 114(2), and so forth.

As discussed above with regard to FIG. 1, the ranked result data 126 may represent ranked search results. In FIG. 2, the ranked result data 126 includes a plurality of query data 114 including query data 114(1), 114(2), and so forth. The query data 114(1) and 114(2) are illustrated such that 114(2) is ranked higher than 114(1) by illustrating the query data 114(2) above the query data 114(1). The ranking module 124 may have determined that the query data 114(2) is associated with a higher score when compared to the query data 114(1). The ranking of the query data 114 is discussed in more detail with regard to FIG. 4.

Figure 3:
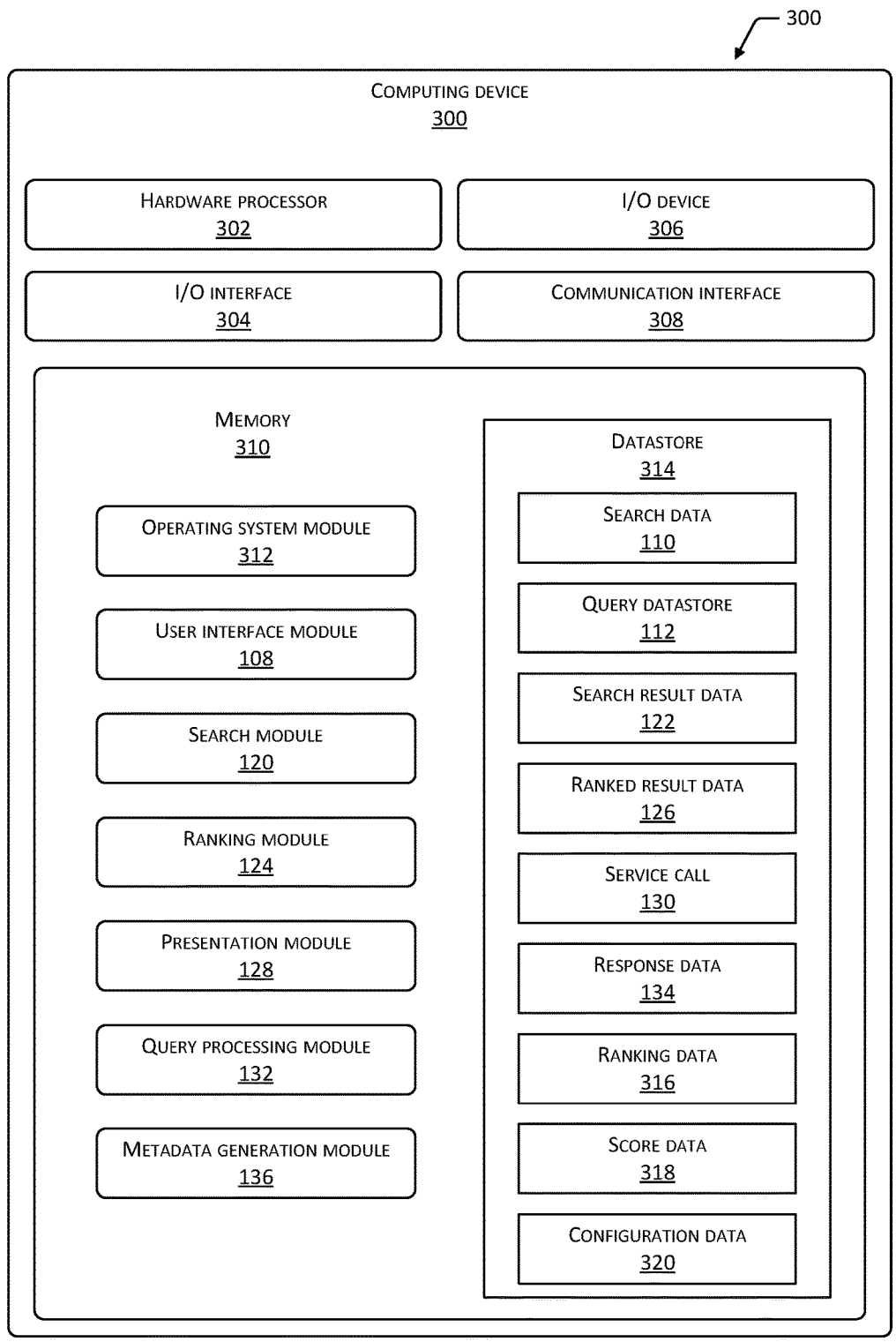
FIG. 3 is a block diagram of a computing device configured to rank queries by comparing the search data with the query data.

FIG. 3 is a block diagram of a computing device 300 configured to rank queries by comparing the search data 110 with the query data 114. At least one of the search system 102, the client device 104, or the query execution system 106 may be implemented as the computing device 300. The computing device 300 may include at least one hardware processor 302 (or "processor") configured to execute stored instructions. The at least one hardware processor 302 may comprise one or more cores.

The computing device 300 includes at least one I/O interface 304 which enables portions of the computing device 300 (e.g., the hardware processor 302) to communicate with other devices. The I/O interface 304 may be configured to implement various protocols, such as inter-integrated circuit ("I2C"), serial peripheral interface bus ("SPI"), Universal Serial Bus ("USB"), RS-232, HDMI, TOSLINK, Bluetooth, and so forth. The at least one I/O interface 304 may be operatively connected to at least one I/O device 306. In some implementations, certain I/O devices 306 are physically incorporated with the computing device 300 or externally placed.

The at least one I/O device 306 may include one or more input devices such as a button or a microphone. The I/O device 306 may include one or more of a variety of output devices such as one or more displays or speakers.

The computing device 300 may include at least one communication interface 308. The communication interface 308 may be configured to provide communications between the computing devices 300 and other devices, routers, access points, servers, other computing devices 300, and so forth. The communication interface 308 may connect to the network.

The computing device 300 may include at least one bus or other internal communications hardware or software that enables for the transfer of data between the various modules and components of the computing device 300.

As illustrated in FIG. 3, the computing device 300 may include at least one memory 310 or memory device 310. The memory 310 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 310 may include computer readable instructions, data structures, program modules, and other data for the operation of the computing device 300.

The memory 310 may include at least one operating system ("OS") module 312. The OS module 312 may be configured to manage hardware resources such as the I/O interface 304, the I/O devices 306, the communication interface 308, and provide various services to applications or modules executing on the hardware processor 302. The memory 310 may also store at least one of the following modules which may be executed as foreground applications, background tasks, daemons, and so forth.

In some implementations, the memory 310 may include the user interface module 108. The user interface module 108 may be configured to provide a user interface to the user using the I/O devices 306 and to accept inputs received from the I/O devices 306. The user interface may include one or more visual, audible, or haptic elements. For example, the user interface may be configured to provide a graphic user interface, an audible user interface, and so forth.

The computing device 300 may include the search module 120. The search module 120 may generate the search result data 122. To generate the search result data 122, the search module 120 may compare the search terms from the search data 110 with terms included within the metadata 118. In one example, the search module 120 retrieves particular query data 114 in response to a determination that a threshold number of search terms match a number of terms included within the metadata 118. In another example, the search module 120 retrieves particular query data 114 in response to a determination that data associated a user conducting a search includes a threshold amount of information.

The computing device 300 may include the ranking module 124. The ranking module 124 may generate the ranked result data 126. The ranking module 124 may rank the search results based on scores associated with retrieved queries.

The computing device 300 may include the presentation module 128. The presentation module 128 may be configured to present information on, or in conjunction with, the client device 104. In one example, the presentation module 128 is configured to cause a display device of the client device 104 to display a ranked list of queries.

The computing device 300 may include the query processing module 132. The query processing module 132 may be configured to process or execute queries. In one example, the query processing module 132 executes a particular query in response to receiving a service call 130. The query processing module 132 may generate the response data 134 which includes the information retrieved from the database.

The computing device 300 may include the metadata generation module 136. The metadata generation module 136 may be configured to generate metadata 118 for a query. In one example, the metadata generation module 136 may enable the user to type in a summary of the query. The metadata generation module 136 may be configured to automatically generate the metadata 118. For example, the metadata generation module 136 may parse a written query for information such as table names or field names that are included within the query. The parsed information may comprise a portion of the metadata 118. In another example, the metadata generation module 136 may automatically generate metadata 118 based on information about the user that is creating the query. For example, the user's identification, or the team that the user works with may be used as metadata 118.

In some implementations, the memory 310 includes a datastore 314 for storing information. The datastore 314 may use a flat file, database, linked list, tree, or other data structure to store the information. In some implementations, the datastore 314, or a portion thereof, may be distributed across at least one other device, such as a server, a network storage device, and so forth. As illustrated in FIG. 3, the datastore 314 may include at least one of the search data 110, the query datastore 112, the search result data 122, the ranked result data 126, the service call 130, the response data 134, ranking data 316, score data 318, or configuration data 320. The datastore 314 may be stored within a data warehouse. The data warehouse may store large amounts of data from many resources.

The search data 110 is used to search for queries. The search data 110 may be manually generated or automatically generated. In one example, the search data 110 includes manually entered search terms such as "information about department A employees". In another example, the search data 110 includes information identifying the user conducting the search, or information identifying the client device 104 to be operated to generate the search data 110.

The query datastore 112 may comprise a data structure stored on one or more memory devices. The query datstore 112 may store a large number of different query data 114 such as two or three million different query data 114. The query data 114 may be generated in response to users writing queries.

The search result data 122 may comprise different query data 114 selected based on the search data 110. The search system 102 may generate the search result data 122 based on a comparison of the search data 110 with the query data 114 stored within the query datastore 112. In one example, a score is determined for each of the query data 114 stored within the query datastore 112. The score may comprise a value indicative of a number of matching terms between the search data 110 and the query data 114. The scores may be generated based on comparisons of the search data 110 with the query data 114. To be retrieved during a query search, the score for particular query data 114 may have to be equal to or greater than a threshold value. In some implementations, the search system 102 ranks the queries based on the score. The ranked result data 126 may comprise these ranked queries. In one example, the search system 102 organizes a list of different queries retrieved from the query datastore 112 in descending order based on scores that are generated for each query. In one example, a first query may have a higher score than a second query because more search terms match terms of the metadata 118 for the first query when compared to the number of search terms that match the terms of the metadata 118 for the second query.

The service call 130 may represent a request for the query execution system 106 to process a query. The client device 104 may generate the service call 130 based on inputs received from a user of the client device 104. The response data 134 may comprise the information retrieved in response to the execution of the selected query. In some implementations, the query execution system 106 generates the response data 134 and provides the response data 134 to the client device 104. The client device 104 may present the response data 134 to the user of the client device 104.

The ranking data 316 may comprise data used as inputs to rank queries. By ranking queries, users may more easily locate the most useful query. In one example, the ranking data 316 includes information about how often a particular query is executed. The ranking data 316 may comprise various information, and is discussed in more detail with regard to FIG. 4.

The score data 318 may comprise a value indicating an amount of terms which match based on a comparison between the search data 110 and the query data 114. The configuration data 320 may comprise information used as an input to generate the score data 318. The configuration data 320 may be adjusted, allowing for calculations to be tailored to particular analytical tasks. The use of the configuration data 320 to adjust calculations is discussed in more detail with regard to FIG. 4.

Figure 4:
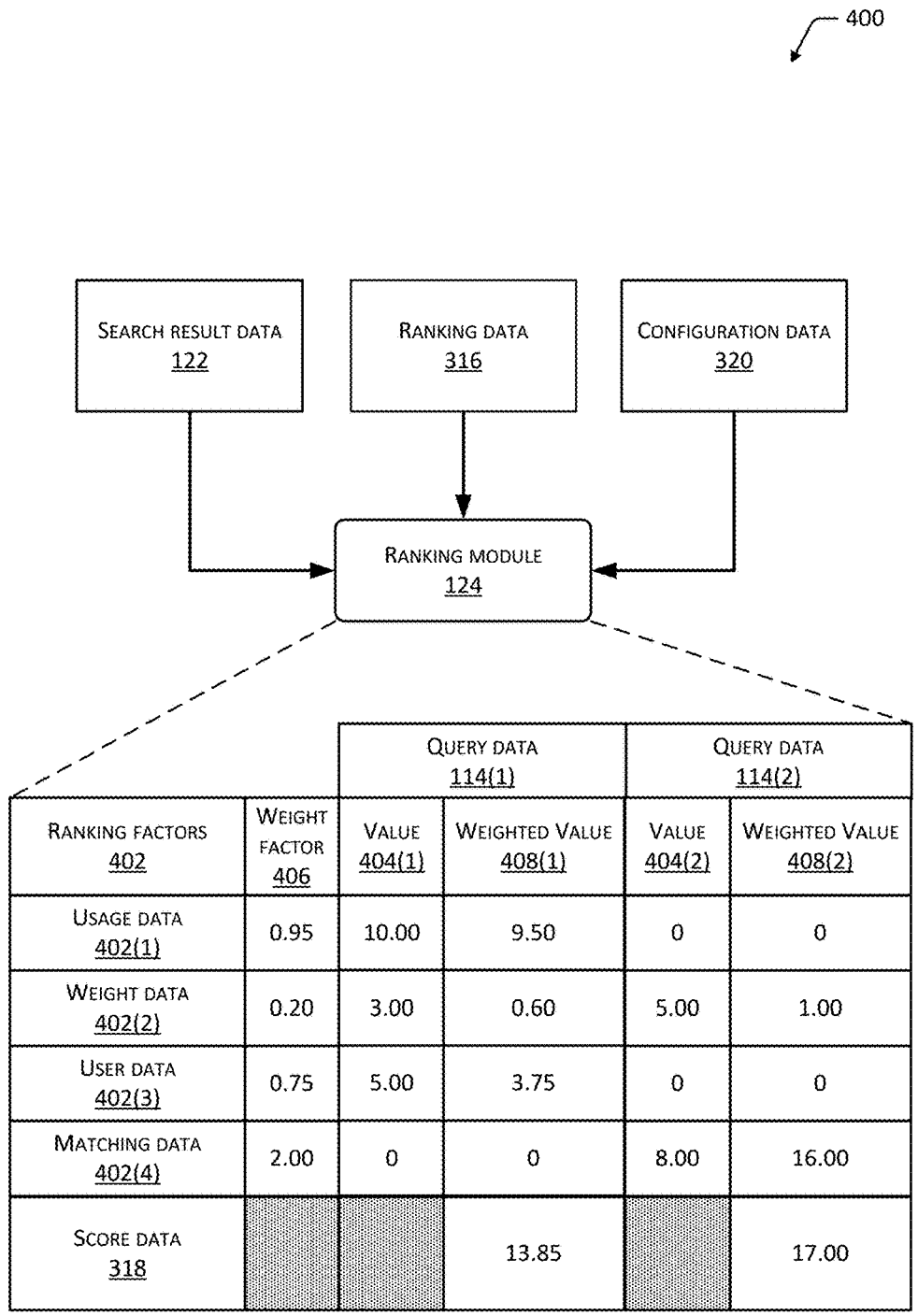
FIG. 4 is an illustration of the generation of score data for different query data using the search result data, the ranking data, and the configuration data as inputs.

FIG. 4 is an illustration of the generation of score data 318 for different query data 114 using the search result data 122, the ranking data 316, and the configuration data 320 as inputs to the ranking module 124. The ranking data 316 includes ranking factors 402. The ranking factors 402 include usage data 402(1), weight data 402(2), user data 402(3), and matching data 402(4).

The usage data 402(1) may represent a value 404 indicative of the number of times a particular query is accessed or used. In another example, the value 404 may be generated based on whether the query has been accessed or used a threshold number of times. For example, if a particular query has been executed at least 100 times, the search system 102 generates a value 404 of "10.00" for the particular query. If the particular query has not been executed at least 100 times, the search system 102 may generate a different value 404 of "0" for the particular query. A query that is used more than other queries may be indicative that the query is a popular query or a well written query. In FIG. 4, the value 404(1) for the usage data 402(1) is "10.00" indicating that the query of the query data 114(1) has been processed or executed at least a threshold number of times. The value 404(2) for the usage data 402(1) is "0" indicating that the query of the query data 114(2) has not been processed or executed at least a threshold number of times.

The weight data 402(2) may represent a value 404 indicative of an amount of resources consumed to process the query. The resources may include memory, processor time, input/output, and so forth. Users may be interested in queries which consume the fewer resources when compared to other queries. In some implementations, the value 404 of the weight data 402(2) is determined based on whether a threshold amount of resources are consumed by a particular query. For example, if a particular query consumes an average amount of resources of at least 50 units, the search system 102 may assign a value of "5.00" to the weight data 402(2) for that particular query. If the particular query consumes an average amount of resources less than 50 units, the search system 102 may assign a different value (e.g., "0") to the weight data 402(2) for that particular query. In FIG. 4, the value 404(1) for the weight data 402(2) is "3.00" indicating that the query of the query data 114(1) consumes 3 units of resources. The value 404(2) for the weight data 402(2) is "5.00" indicating that the query of the query data 114(2) consumes 5 units of resources.

The user data 402(3) may identify the user that created the query. Users may have reputations for writing queries. A user searching for a query may be interested in queries created by a particular user because that particular user may have a reputation for creating well written queries. In some implementations, the search system 102 may assign certain values to queries written by certain people. For example, in FIG. 4, the search system 102 assigns a value 404(1) of "5.00" for the user data 402(3) because the user data 402(3) indicates that the user that created the query of query data 114(1) has a good reputation for creating well written queries. For the query data 114(2), the search system 102 assigns a value 404(2) of "0", which may indicate that the user that created the query of query data 114(2) may not have a reputation for creating well written queries.

The matching data 402(4) may indicate an amount of search terms which match between the search terms and the terms of the metadata 118. For example, in FIG. 4, a user at the client device 104 may have input search terms comprising "what are the items that generated the most revenue during last year?" In this example, the query data 114(1) includes metadata 118 indicating that the reason the query for the query data 114(1) was created was to determine information about users working at department A. The query data 114(2) includes metadata 118 indicating that the reason the query for the query data 114(2) was created was to determine which items generated the most amount of revenue last year. The search system 102 may determine the value 404 of the matching data 402(4) based on whether a threshold amount of terms match. As the number of matching terms increase, the value 404 for the matching data 402(4) may increase. For example, for every 3 terms that match, the search system may add 3 units to the value 404 of the matching data 402(4).

The configuration data 320 may include weight factors 406. The weight factors 406 are configured to allow configuration of how the score data 318 is generated. The search system 102 may be configured to enable the user to select or change one or more of the weight factors 406 using an input device.

In FIG. 4 the weight factor 406 is illustrated as a factor to develop a weighted mean, wherein the value 404 is multiplied by the weight factor 406. For example, the weight factor 406 may be set to less than one to diminish the impact of a particular ranking factor 402 or greater than one to increase the impact of a particular ranking factor 402 on the score data 318. In other implementations, functions other than, or in addition to, the weighted mean may be used.

Continuing the example, the value for the weight data 402(2) is given a relatively low weight factor 406 of "0.20", while the matching data 402(4) has a weight factor 406 of "2.00". As a result, the value of the score data 318 may be more significantly impacted by the matching data 402(4) than the weight data 402(2). The weight factors 406 may be adjusted, allowing for the weights to be tailored to particular analytical tasks.

The weighted values 408 may be summed or otherwise combined to generate the value of the score data 318. Continuing the example, in this illustration the query data 114(1) has a total weight of "13.85", and the query data 114(2) has a total weight of "17.00". Using these techniques, the ranking module 124 is thus able to generate the score data 318. The search system 102 may rank the different query data 114(1) and 114(2) based on the score data 318. For example, the search system 102 may rank the query data 114(2) higher than the query data 114(1) because the score for the query data 114(2) is higher than the score generated for the query data 114(1).

Figure 5:
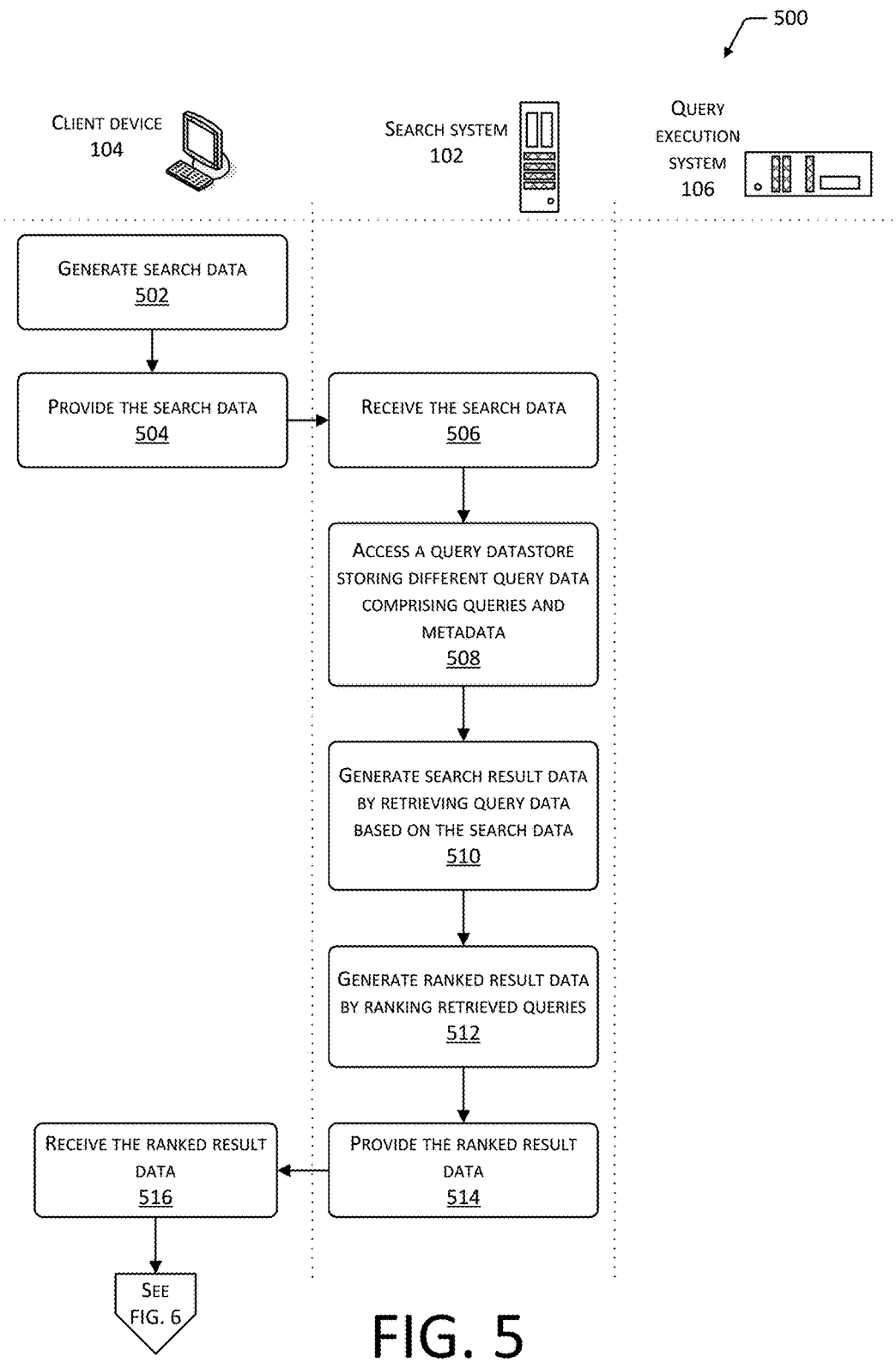
FIGS. 5 and 6 depict a flow diagram illustrating a process of providing response data generated based on the selection of a ranked query.
Figure 6:
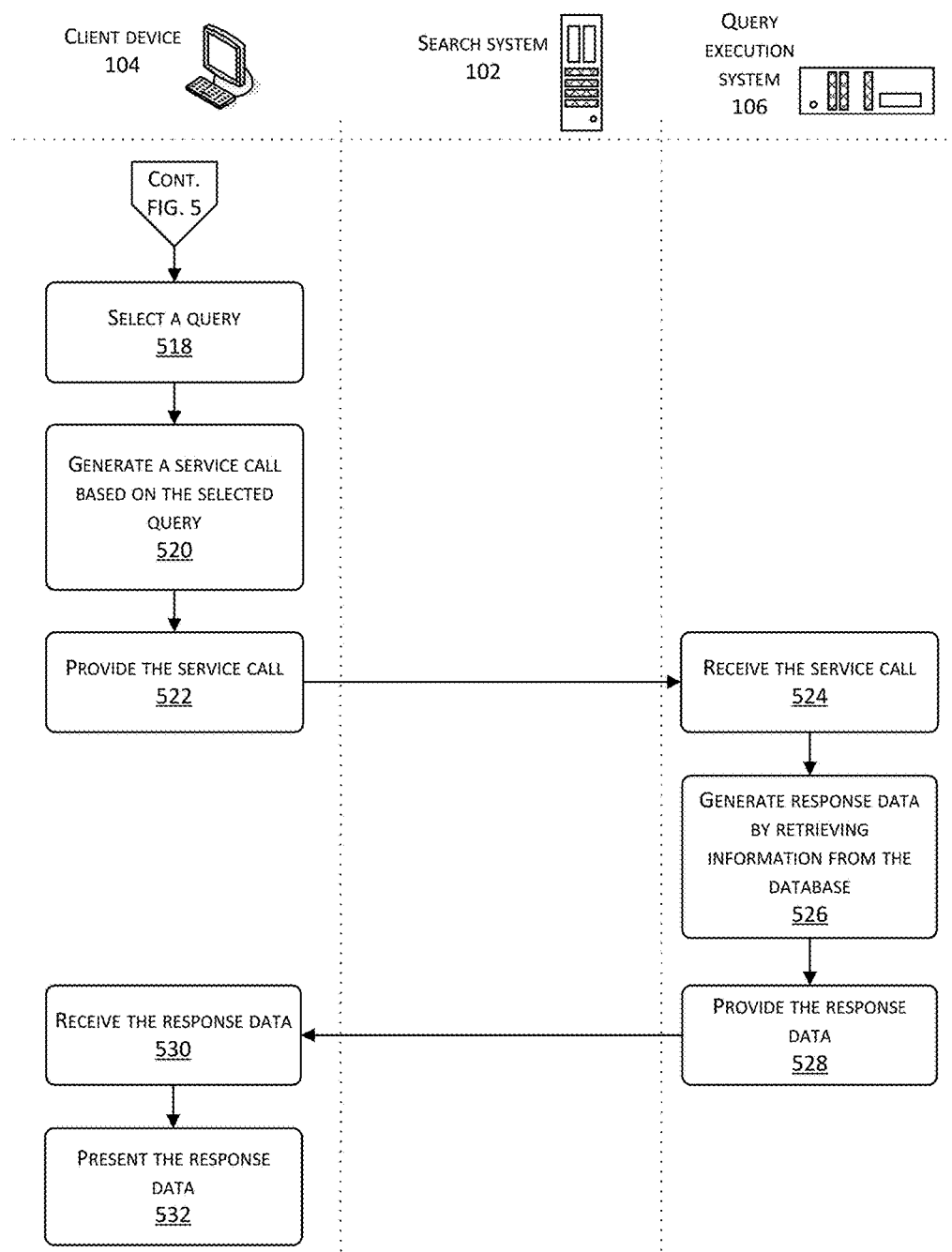

FIGS. 5 and 6 depict a flow diagram 500 illustrating a process of providing response data 134 generated based on the selection of a ranked query. Although the process 500 is described with reference to the flowchart illustrated in FIGS. 5 and 6, many other methods for performing the acts associated with the process 500 may be used. For example, the order of the steps may be changed, some of the steps described may be optional, and additional steps may be included.

At 502, the client device 104 generates search data 110. The search data 110 may be generated manually or automatically. For example, a user may operate with an input device (e.g., a keyboard) of the client device 104 to type in search terms. In another example, the client device 104 may automatically generate the search data 110 by analyzing data associated with the user conducting a search. For example, the search data 110 may indicate an identification number associated with the user conducting the search, or may indicate an identification of a department in which the user conducting the search works. At 504, the client device 104 provides the search data 110 to the search system 102. At 506, the search system 102 receives the search data 110.

At 508, the search system 102 accesses the query datastore 112 storing different query data 114 comprising queries and metadata 118. The queries may be described as sets of instructions, which when executed by the query execution system 106, cause the query execution system 106 to retrieve information. For a particular query, the metadata 118 may be manually generated or automatically generated. In one example, the search system 102 automatically generates the metadata 118 by parsing the query. For example, the query may include a plurality of instructions which include a reference to a particular table. The search system 102 may parse the name of the table included within the query, and generate metadata 118 comprising data identifying the table.

At 510, the search system 102 generates the search result data 122 by retrieving query data 114 based on the search data 110. The search system 102 may retrieve query data 114 in response to a determination that one or more of the terms of the search data 110 match a threshold number of terms of the metadata 118. For example, the threshold number may be configured to be 3. For a first query data 114, the terms of the metadata 118 may comprise reason data 204 which indicate that the first query data 114 was created to determine which items generate the most revenue. A user operating the client device 104 enters the search terms "what items generate the most revenue?" In this example, the search system 102 may determine that 4 terms match (i.e., items, generate, most, revenue). Because more than the threshold number of terms match, the search system 102 may retrieve the first query data 114.

The search system 102 may generate the search result data 122 based on a profile associated with the user conducting the search. The profile may include information that is manually entered by the user, or information that is automatically generated. In one example, the client device 104 automatically generates the information. The information may specify information such a group, team, or department that the user is associated with or that the user is interested in being associated with. For example, the user may work within an electronics department and not the jewelry department. In this example, the user is interested in queries that will provide information about electronic items, and the user is not interested in queries providing information about jewelry. The user may configure their profile such the search results would include queries associated with the electronic items, and not queries associated with jewelry.

In some implementations, the search result data 122 includes recommended queries. For example, the search system 102 may select certain query data 114 based on an analysis of the profile of the user conducting the search. The profile of the user may indicate certain interests such as an interest in electronics or jewelry. Based on the information about the user's interests, the search system 102 may generate the search result data 122 such that the search result data 122 includes query data 114 associated with electronics or jewelry. In one example, particular query data 114 is associated with electronics because the user that created the particular query data 114 works within the electronics department.

The search system 102 may recommend queries for the user using various techniques, including collaborative filtering, content-based filtering, or a hybrid technique that includes a combination of the collaborative filtering and the content-based filtering. In one example, using the collaborative filtering, any number of algorithms can be used to measure the similarity between users or the similarity between queries, such as the k-nearest neighbors algorithm. The search system 102 may determine a set of users who select, execute, or similarly rate the same queries. The search system 102 may then aggregate the queries from the set of similar users, filter out queries that the user has already selected or executed, and recommend the remaining queries to the user.

In another example, the search system 102 recommends a query that is similar to a selected/executed query. To do so, the search system 102 may generate a table of similar queries by identifying queries that users tend to execute together. A query-to-query matrix can then be generated by iterating through all query pairs and computing a similarity metric for each pair. Once the table of similar queries is generated, the search system 102 may identify queries similar to each of the user's selected/executed queries (or ratings of queries), aggregate those queries, and then recommend the most popular/correlated queries. In some implementations, the recommended queries are generated based on explicit feedback from users (e.g., ratings or rankings) or implicit feedback (e.g., observing what queries the users select/execute).

At 512, the search system 102 generates ranked result data 126 by ranking retrieved queries. As discussed in more detail above with regard to FIG. 4, the search system 102 may rank the search results based on the score data 318. At 514, the search system 102 provides the ranked result data 126 to the client device 104. At 516, the client device 104 receives the ranked result data 126.

At 518, the client device 104 selects a query. The client device 104 may select a query in response to receiving input from an input device (e.g., a keyboard) based on user input. At 520, the client device 104 generates a service call 130 based on the selected query. The service call 130 may represent a request for the query execution system 106 to process the selected query. The service call 130 may include the selected query. At 522, the client device 104 provides the service call 130 to the query execution system 106. The client device 104 may provide the service call 130 to the query execution system 106 in response to a user's selection. At 524, the query execution system 106 receives the service call 130.

At 526, the query execution system 106 generates response data 134 by retrieving information from a database. The information may include various data. In one example, the query execution system 106 reads from one or more tables to generate the response data 134. The response data 134 may include the results of the execution of the query. In some implementations, response data 134 comprises an email that is provided to the user indicating that the results of the execution of the query have been generated. The user may then operate with the client device 104 to access the results which may be stored in a separate database.

At 528, the query execution system 106 provides the response data 134 to the client device 104. As discussed above with regard to FIG. 1, in some implementations, the query execution system 106 may not process the service call 130, but rather provide the service call 130 to another computing device for processing. In these implementations, the query execution system 106 may be described as operating as a job scheduler that allocates jobs to cluster nodes in a data warehouse.

At 530, the client device 104 receives the response data 134. At 532, the client device 104 presents the response data 134. The presentation of the response data 134 may include causing a display device of the client device 104 to display the information retrieved by the query execution system 106.

In some implementations, the client device 104 enables a user to create queries and the metadata 118 associated with queries. The client device 104 may enable the user to operate with an input device of the client device 104 to receive input data representing the query and the metadata 118. The client device 104 may be configured to automatically generate the metadata 118. The client device 104 may automatically generate the metadata 118 by parsing a query. For example, the client device 104 may parse a written query for information such as table names or field names that are included within the query. The table name or field names may comprise a portion of the metadata 118.

In some implementations, the metadata 118 is generated by analyzing or processing certain information. For example, the client device 104 may determine information about the user that created a particular query. This information may include an identification number associated with the user. Using the identification number, the client device 104 may search a table that may provide additional information based on the identification number. For example, the client device 104 may determine that based on the identification number, the user that created the particular query works within a department that has a good reputation for writing queries. The client device 104 may generate metadata 118 which indicates that the particular query was created by a user that works within the department known for making well written queries.

Figure 7:
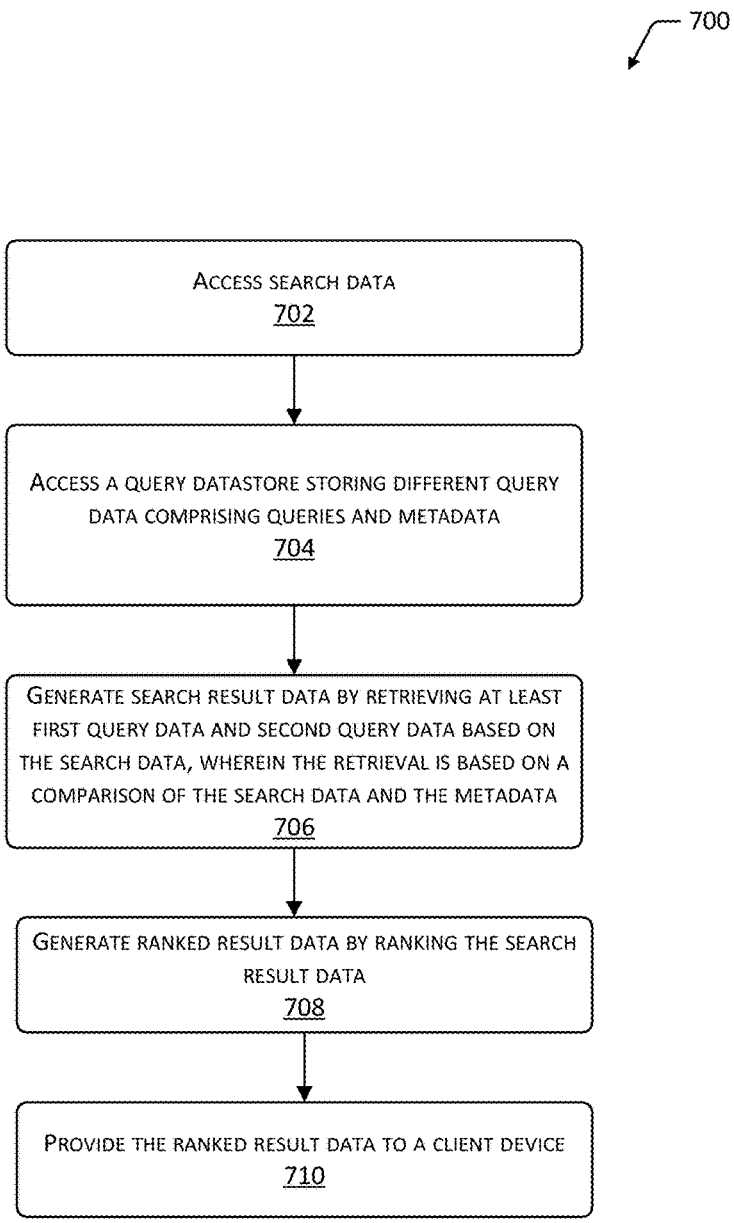
FIG. 7 is a flow diagram illustrating a process of generating search result data by retrieving queries based on a comparison of search data and metadata.

FIG. 7 is a flow diagram illustrating a process of generating search result data 122 by retrieving queries based on a comparison of search data 110 and metadata 118. Although the process 700 is described with reference to the flowchart illustrated in FIG. 7, many other methods for performing the acts associated with the process 700 may be used. For example, the order of the steps may be changed, some of the steps described may be optional, and additional steps may be included.

At 702, the search system 102 accesses search data 110. The search data 110 may be provided by the client device 104. The search data 110 may be at least one of manually generated or automatically generated. For example, a user at the client device 104 typing in search terms may manually enter the search data 110.

At 704, the search system 102 accesses the query datastore 112 storing different query data 114 comprising queries and metadata 118. As described above with regard to FIG. 2, the metadata 118 may include a variety of information such as the reason data 204, the usage data 206, the weight data 208, and so forth. In some implementations, the query data 114 includes sample output data 202. For a particular query, the sample output data 202 may include previously generated results provided in response to the particular query being executed by the query execution system 106. The sample output data 202 may be useful because a user may decide that because the previously generated search results were generated within a designated period of time (e.g., within the last hour), the information included within the sample output data 202 is what the user was looking for.

At 706, the search system 102 generates the search result data 122 by retrieving at least first query data 114 and second query data 114 based on the search data 110. The search system 102 may retrieve the first and second query data 114 based on a comparison of the search data 110 and the metadata 118. In one example, the search system 102 retrieves particular query data 114 in response to a determination that user data associated with the user that entered in the search terms includes a threshold amount of information. For example, a user that enters in the search terms may have a particular identification number associated with themselves, may work within a particular department, and may have started working with the company one year ago. The search system 102 may be configured to retrieve certain queries based on this information. That is, the search system 102 may be configured to retrieve a certain query because the user has a particular identification number, worked within a certain department, worked with the company for at least one year, and so forth.

At 708, the search system 102 generates the ranked result data 126 by ranking the search result data 122. The search system 102 may rank the search results based on the score data 318. For example, the search system 102 may generate different scores for each query data 114 of the datastore 112 and organize the retrieved query data 114 in descending order based on the scores. In one example, the search system 102 generates the score based on the amount of search terms that match the terms of the metadata 118. In some implementations, for the queries, the search system 102 generates score data 318 representing an aggregated value generated based on a sum of weighted values 408. The generation of the score data 318 is discussed in more detail with regard to FIG. 4. At 710, the search system 102 provides the ranked result data 126 to the client device 104.

Figure 8:
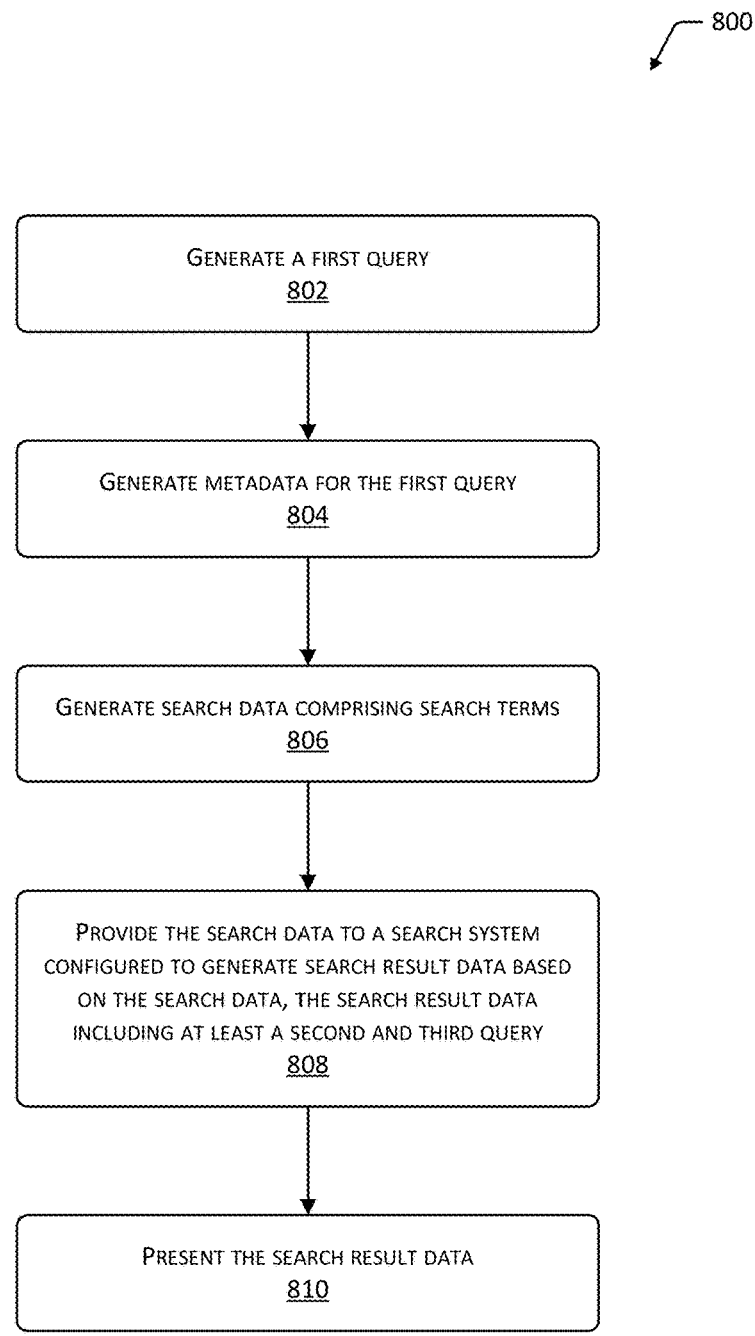
FIG. 8 is a flow diagram illustrating a process of generating metadata and search data used to obtain search results.

FIG. 8 is a flow diagram 800 illustrating a process of generating the metadata 118 and the search data 110 used to obtain search results. Although the process 800 is described with reference to the flowchart illustrated in FIG. 8, many other methods for performing the acts associated with the process 800 may be used. For example, the order of the steps may be changed, some of the steps described may be optional, and additional steps may be included.

At 802, the client device 104 generates a first query. The client device 104 may generate the first query in response to receiving inputs from an input device (e.g., a keyboard) operated by a user.

At 804, the client device 104 generates metadata 118 for the first query. The metadata 118 may be manually generated or automatically generated. For example, the metadata 118 may be manually generated based on inputs received from a user at the client device 104. In another example, the client device 104 automatically generates the metadata 118 by parsing the text of the query to determine which tables will be accessed during execution of the query. In another example, the client device 104 automatically generates the metadata 118 based on a user identification associated with the user that created the query. The metadata 118 may include an identification number associated with the user that created the query.

At 806, the client device 104 generates search data 110 comprising search terms. The search data 110 may include search terms entered by a user operating with the user interface. For example, the user may enter the following search terms: "items generating the most revenue."

At 808, the client device 104 provides the search data 110 to the search system 102 which is configured to generate the search result data 122 based on the search data 110. The search result data 122 includes at least a second and third query.

At 810, the client device 104 presents the search result data 122. The client device 104 may present the ranked result data 126 by displaying a list of queries with a display device.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A data warehouse system comprising:
   a first computer device communicatively coupled to a client device; and
   a second computer device communicatively coupled to the client device, wherein the second computer device is configured to:
   access search data comprising one or more search terms;
   access a query datastore storing a plurality of previously queried query data including first query data and second query data, wherein:
   the first query data comprises:
   a first set of instructions configured to cause the first computer device to retrieve first information that was previously queried from a first database and sample output data representative of previously generated results; and
   first metadata comprising information about the first query data, wherein the first metadata includes first reason data representative of a first explanation for creating the first set of instructions;
   the second query data comprises:
   a second set of instructions configured to cause the first computer device to retrieve second information that was previously queried from a second database; and
   second metadata comprising information about the second query data, wherein the second metadata includes second reason data representative of a second explanation for creating the second set of instructions;
   generate search result data by retrieving at least the first query data and the second query data based on the search data, wherein:
   the search result data comprises at least the first query data and the second query data; and
   the retrieval is based on a comparison of the search data and the first metadata and second metadata;
   generate ranked result data by ranking the search result data based on at least usage data, weight data, user data, and matching data, wherein the usage data represents a value indicative of a number of times that at least the first query data and the second query data is accessed, wherein the weight data represents a value indicative of an amount of resources consumed to process individually the first set of instructions and the second set of instructions, wherein the user data represents information identifying a user that created the first set of instructions and a user that created the second set of instructions, and wherein the matching data represents a value indicative of an amount of the one or more search terms which match between the search data and the first metadata and second metadata;
   provide the ranked result data to the client device; and
   wherein the first computer device is configured to provide response data to the client device based on a selection of the first set of instructions at the client device, wherein the response data comprises the first information that was previously queried from the first database.

2. The system of claim 1, wherein at least the first query data and the second query data are retrieved in response to a determination that one or more of the one or more search terms match a threshold number of terms of the first metadata and the second metadata.

3. The system of claim 1, wherein the first metadata is automatically generated by parsing the first set of instructions.

4. A method comprising:
   accessing search data comprising one or more search terms;
   accessing a query datastore storing a plurality of previously queried query data including first query data and second query data, wherein:
   the first query data comprises:
   a first set of instructions used by a computer device to retrieve first information that was previously queried from a first database; and
   first metadata comprising first reason data representative of an explanation for creating the first set of instructions;
   the second query data comprises:
   a second set of instructions configured to cause the computer device to retrieve second information that was previously queried from a second database; and
   second metadata comprising second reason data representative of an explanation for creating the second set of instructions;
   generating search result data by retrieving at least the first query data and the second query data based on the search data, wherein the search result data comprises at least the first query data and the second query data;

determining matching data comprising a value indicative of an amount of the one or more search terms which match between the search data and the first metadata and the one or more search terms which match between the search data and the second metadata;

determining usage data comprising a value indicative of a number of times that at least the first query data and the second query data is accessed;

determining weight data comprising a value indicative of a first amount of resources consumed by processing the first set of instructions and a second amount of resources consumed by processing the second set of instructions;

generating ranked result data by ranking the search result data based on at least the usage data, the weight data, and the matching data; and providing the ranked result data to a client device.

5. The method of claim 4, wherein the first metadata further includes at least one of:

table data representative of an identification of a table which is accessed to retrieve the first information, wherein the table includes a plurality of fields;

field data representative of an identification of one or more of the plurality of fields;

user data representative of an identification of a user that created the first set of instructions;

time data representative of when the first set of instructions were created; or description data representative of a summary of the first set of instructions.

6. The method of claim 4, wherein at least the first query data and the second query data are retrieved in response to a determination that one or more of the one or more search terms match at least a portion of the first metadata and the second metadata.

7. The method of claim 4, wherein at least the first query data and the second query data are retrieved in response to a determination that a threshold amount of information about a user that entered in the one or more search terms match at least a portion of the first metadata and the second metadata.

8. The method of claim 4, wherein the weight data comprising the value is further based on generating score data associated with the first query data, the score data representative of an aggregated value generated based on a sum of a first weighted value and a second weighted value, wherein the first weighted value is generated based on an amount of the one or more search terms matching a portion of the first metadata, and the second weighted value is generated based on an amount of information about a user that entered the one or more search terms matching at least the portion of the first metadata.

9. The method of claim 4, further comprising receiving:

first input data from a user operating an input device, the first input data representative of a third set of instructions configured to cause the computer device to retrieve third information that was previously queried from a third database; and second input data from the user operating the input device, the second input data representative of third metadata comprising information about the third set of instructions.

10. The method of claim 4, further comprising:

receiving first input data from a user operating an input device, the first input data representative of a third set of instructions configured to cause the computer device to retrieve third information from a third database; and automatically generating third metadata by parsing the third set of instructions, the third metadata comprising information about the third set of instructions.

11. The method of claim 4, further comprising:

receiving first input data from a user operating an input device, the first input data representative of a third set of instructions configured to cause the computer device to retrieve third information from a third database; and automatically generating third metadata based on an analysis of the third set of instructions and information about a user that created the third set of instructions, the third metadata comprising information about the third set of instructions.

12. The method of claim 4, wherein the first query data includes sample output data representative of previously generated results provided in response to the first set of instructions being executed.

13. The method of claim 4, wherein the first database is different from the second database.

14. The method of claim 4, wherein:

the first set of instructions and the second set of instructions comprise instructions expressed using structured query language; and the first database and the second database comprise a relational database.

15. A method comprising:

accessing search data comprising one or more search terms;

accessing a query datastore storing a plurality of previously queried query data including first query data and second query data, wherein:

the first query data comprises:

a first set of instructions configured to cause a first computer device to retrieve first information that was previously queried from a first database and sample output data representative of previously generated results; and first metadata comprising information about the first query data, wherein the first metadata includes first reason data representative of a first explanation for creating the first set of instructions; and the second query data comprises:

a second set of instructions configured to cause the first computer device to retrieve second information that was previously queried from a second database; and second metadata comprising information about the second query data, wherein the second metadata includes second reason data representative of a second explanation for creating the second set of instructions;

generating search result data by retrieving at least the first query data and the second query data based on the search data, wherein:

the search result data comprises at least the first query data and the second query data; and the retrieval is based on a comparison of the search data and the first metadata and second metadata;

determining matching data comprising a value indicative of an amount of the one or more search terms which match between the search data and the first metadata and the one or more search terms which match between the search data and second metadata;

determining usage data comprising a value indicative of a number of times that at least the first query data and the second query data is accessed;

determining weight data comprising a value indicative of a first amount of resources consumed by processing the first set of instructions and a second amount of resources consumed by processing a second set of instructions;

determining user data comprising information identifying a user that created the first set of instructions and a user that created the second set of instructions;

generating ranked result data by ranking the search result data based on at least the usage data, the weight data, the matching data, and user data; and providing the ranked result data to a device.

16. The method of claim 15, wherein:

the search result data further comprises a recommended query; and a search system is configured to select the recommended query in response to determination that the recommended query is associated with a score that is equal to or greater than a threshold score, wherein the score is generated based on feedback from users of the search system.

17. The method of claim 15, wherein:

the first query data is generated by a first client device;

the second query data is generated by a second client device; and the first and second query data are stored at the query datastore.

18. The method of claim 15, wherein the first query data includes sample output data representative of previously generated results provided in response to the first set of instructions being executed.

19. The method of claim 15, wherein at least the first query data and the second query data are retrieved in response to a determination that one or more of the one or more search terms match a threshold number of terms of the first metadata and the second metadata.

20. The method of claim 15, wherein the first metadata is automatically generated by parsing the first set of instructions.

* * * * *

UNITED STATES PATENT AND TRADEMARK OFFICE
CERTIFICATE OF CORRECTION

Page 1 of 1

PATENT NO. : 10,394,826 B1
APPLICATION NO. : 14/187710
DATED : August 27, 2019
INVENTOR(S) : Suresh Viswanathan It is certified that error appears in the above-identified patent and that said Letters Patent is hereby corrected as shown below:

In the Claims

Column 19, Claim 4, Line 17:
Reads "result data to a client device."
Where it should read --result data to a device.--

Column 21, Claim 15, Line 11:
Reads "the matching data, and user data; and"
Where it should read --the matching data, and the user data; and--

Signed and Sealed this
Eighth Day of October, 2019

Andrei Iancu
*Director of the United States Patent and Trademark Office*